United States Patent
Sano

(10) Patent No.: US 10,404,114 B2
(45) Date of Patent: Sep. 3, 2019

(54) ROTARY ELECTRIC MACHINE ROTOR

(71) Applicant: TOYOTA JIDOSHA KABUSHIKI KAISHA, Toyota-shi, Aichi-ken (JP)

(72) Inventor: Shinya Sano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 17 days.

(21) Appl. No.: 15/855,257

(22) Filed: Dec. 27, 2017

(65) Prior Publication Data
US 2018/0198331 A1    Jul. 12, 2018

(30) Foreign Application Priority Data

Jan. 11, 2017 (JP) ................ 2017-002784

(51) Int. Cl.
*H02K 1/27*    (2006.01)
*H02K 1/02*    (2006.01)

(52) U.S. Cl.
CPC .............. *H02K 1/276* (2013.01); *H02K 1/02* (2013.01); *H02K 1/2766* (2013.01)

(58) Field of Classification Search
CPC .......... H02K 1/27; H02K 1/02; H02K 1/2766; H02K 1/276
See application file for complete search history.

(56) References Cited

U.S. PATENT DOCUMENTS

| | | | | |
|---|---|---|---|---|
| 6,204,580 B1* | 3/2001 | Kazmierczak | ........... | H02K 3/24 |
| | | | | 310/216.119 |
| 8,841,814 B2* | 9/2014 | Arimatsu | ................ | H02K 1/30 |
| | | | | 310/216.119 |
| 8,970,085 B2* | 3/2015 | Takahashi | .............. | H02K 1/276 |
| | | | | 310/216.114 |

FOREIGN PATENT DOCUMENTS

| | | |
|---|---|---|
| CN | 101917106 A | 12/2010 |
| JP | 2001037119 A | 2/2001 |
| JP | 2013-055775 A | 3/2013 |
| JP | 2015-226368 A | 12/2015 |
| WO | 01/06624 A1 | 1/2001 |

\* cited by examiner

*Primary Examiner* — Naishadh N Desai
(74) *Attorney, Agent, or Firm* — Sughrue Mion, PLLC

(57) ABSTRACT

A rotary electric machine rotor includes a rotor core having a magnet hole, a magnet, a first end plate, and a second end plate. The core steel sheets, each of plates are made of the same materials. The first end plate has at least one first hole. The second end plate has at least one second hole. When viewed from one axial side of the rotor core, the first hole and the second hole overlap with at least part of the magnet in the axial end surface of the magnet hole. When viewed from one axial side of the rotor core, the first hole has a part at least partially placed at a position different from the second hole.

8 Claims, 11 Drawing Sheets

LEAKAGE FLUX

ROTARY ELECTRIC MACHINE ROTOR

INCORPORATION BY REFERENCE

The disclosure of Japanese Patent Application No. 2017-002784 filed on Jan. 11, 2017 including the specification, drawings and abstract is incorporated herein by reference in its entirety.

BACKGROUND

1. Technical Field

The present disclosure relates to a rotary electric machine rotor including a rotor core, a magnet inserted in a magnet hole of the rotor core, and an end plate.

2. Description of Related Art

In terms of a rotary electric machine rotor constituting a rotary electric machine, there has been conventionally known a configuration in which a magnet is inserted into a magnet hole of a rotor core, and the magnet is fixed to the rotor core.

Japanese Patent Application Publication No. 2013-55775 (JP 2013-55775 A) describes a configuration in which a rotor core is formed by laminating a plurality of electromagnetic steel sheets, and magnets, which are permanent magnets, are inserted into axial holes (magnet holes) formed at a plurality of positions of the rotor core. In the above configuration, end plates are placed at both axial ends of the rotor core. The end plate has a function to prevent protrusion of the magnets from the rotor core in an axial direction. The end plate is made of a non-magnetic substance such as aluminum and aluminum alloy. JP 2013-55775 A describes that, when the end plate is made of a non-magnetic substance, it is possible to effectively restrain a leakage of magnetic flux in the axial ends of the magnets.

SUMMARY

In a case of using the non-magnetic substance for the end plate, like the configuration described in JP 2013-55775 A, a manufacturing cost easily increases. In the meantime, it is conceivable that, when the end plate is constituted by a steel sheet made of the same material as a steel sheet constituting the rotor core, an increase of the manufacturing cost is restrained. However, in a case where the end plate is simply made of such a steel sheet, a magnetic flux leakage easily occurs. The magnetic flux leakage is a phenomenon that a magnetic flux emitted from the magnet leaks toward the end plate without being directed to a stator. When this magnetic flux leakage occurs, a magnetic flux short circuit in which the magnetic flux emitted from the magnet is short-circuited through the end plate might occur. The occurrence of the magnetic flux leakage and the magnetic flux short circuit decreases magnetic fluxes contributing to a torque of the rotary electric machine and increases a loss, which is undesirable. In a configuration where the magnets are not opposed to the end plate, the magnetic flux leakage can hardly occur, but in that case, it is difficult to restrain protrusion of the magnet from the hole of the rotor core.

A rotary electric machine rotor of the present disclosure restrains a manufacturing cost, restrains a magnetic flux leakage of magnets, and increases magnet protrusion prevention performance.

A rotary electric machine rotor of the present disclosure includes: a rotor core including a plurality of core steel sheets laminated to each other, and having a magnet hole extending in an axial direction of the rotary electric machine rotor; a magnet placed in the magnet hole; a first end plate placed adjacent to an axial end surface of the rotor core; and a second end plate laminated adjacent to a surface of the first end plate on an opposite side to the surface adjacent to the end surface, wherein: the core steel sheets, the first end plate, and the second end plate are made of the same materials; the first end plate has at least one first hole and the first end plate covers an axial end surface of the magnet inside the magnet hole when viewed from one axial side of the rotor core; the second end plate has at least one second hole; and when viewed from the one axial side of the rotor core, the first hole and the second hole overlap with at least part of the magnet in the axial end surface of the magnet hole, and the first hole has a part at least partially placed at a position different from the second hole.

In the present disclosure, the first end plate and the second end plate are constituted by steel sheets made of the same material as the steel sheet of the rotor core, so that it is possible to restrain an increase of a manufacturing cost. Further, the first end plate covers the axial end surface of the magnet, and a magnetic flux leakage of the magnet can be restrained by the first leakage flux restraint hole of the first end plate. Further, the second end plate is laminated on the outer side of the first end plate, and when viewed from the one axial side, the first hole and the second are at least partially placed at different positions. Accordingly, the first hole is at least partially closed, and a magnetic flux leakage of the magnet in the second end plate can be restrained by the second hole. Further, it is possible to increase the magnet protrusion prevention performance. Accordingly, it is possible to restrain the manufacturing cost, to restrain the magnetic flux leakage of the magnet, and to increase the magnet protrusion prevention performance.

In the rotary electric machine rotor of the present disclosure, the rotor core may include a resin portion placed in at least part of a gap between the magnet hole and the magnet, and extending in the axial direction. When viewed from the one axial side, the first hole and the second hole may overlap with an axial end surface of the resin portion; and a part where the first hole and the second hole overlap with the axial end surface of the resin portion may include a part where the first hole includes a part at least partially placed at a position different from the second hole.

With the above configuration, restraint of a leakage flux flowing through parts opposed to the resin portion in the first end plate and the second end plate can be balanced with restraint of resin protrusion due to a crack of the resin portion.

In the rotary electric machine rotor of the present disclosure, the first hole may include a plurality of first holes placed in the first end plate; the second hole may include a plurality of second holes placed in the second end plate; and when viewed from the one axial side, the plurality of first holes and the plurality of second holes may overlap with the axial end surface of the magnet.

In the above configuration, when a ratio of the holes in a unit area of the first end plate is increased and each of the holes is made small, it is possible to increase a total number of holes. This can highly balance the restraint of the leakage flux with the restraint of protrusion of the magnet.

In the rotary electric machine rotor of the present disclosure, the rotor core may include a resin portion placed in at least part of a gap between the magnet hole and the magnet and extending in the axial direction; the first end plate may have a plurality of third holes; the second end plate may have a plurality of fourth holes; and when viewed from the one axial side, the plurality of third holes and the plurality of fourth holes may overlap with the resin portion, and each of the plurality of third holes may be at least partially placed at a position different from each of the plurality of fourth holes.

With this preferable configuration, when a ratio of the holes in a unit area in a part opposed to the resin portion in each end plate is increased and each of the holes is made small, it is possible to increase a total number of holes. This makes it possible to balance restraint of a leakage flux flowing through the part opposed to the resin portion in the end plate, with restraint of protrusion of the resin due to a crack of the resin portion.

In the rotary electric machine rotor of the present disclosure, the first holes and the third holes may have a circular shape; and each of diameters of the third holes is smaller than each of diameters of the first holes. With this preferable configuration, when a ratio of the holes in a unit area in a part opposed to the resin portion in each end plate is increased and each of the holes is made small, it is possible to increase a total number of holes. This makes it possible to balance restraint of a leakage flux flowing through the part opposed to the resin portion in the end plate, with restraint of protrusion of the resin due to a crack of the resin portion.

In the rotary electric machine rotor of the present disclosure, an arrangement distance between the first holes may be larger than an arrangement distance between the third holes. With this preferable configuration, a length of the leakage flux path between the first holes can be increased. This makes it possible to further restrain the occurrence of the magnetic flux short circuit through the first end plate, thereby making it possible to restrain a torque decrease and a loss increase in the rotary electric machine.

In the rotary electric machine rotor of the present disclosure, the first end plate and the second end plate may have the same shape, and the first end plate and the second end plate may be laminated in a state where a phase of the first end plate in a circumferential direction is different from a phase of the second end plate in the circumferential direction, or the first end plate and the second end plate may be laminated in a state that either one of the first end plate and the second end plate is reversed.

In this preferable configuration, steel sheets having the same shape can be used for the first steel sheet of the first end plate and the second steel sheet of the second end plate, thereby making it possible to further reduce the manufacturing cost of the end plates.

With the rotary electric machine rotor of the present disclosure, it is possible to restrain the manufacturing cost, to restrain the magnetic flux leakage of the magnet, and to increase the magnet protrusion prevention performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment of the present disclosure with reference to the drawings. A shape, a material, and a number to be described below are exemplifications for descriptions, and they can be changed appropriately according to a specification of a rotary electric machine rotor. In the following description, equivalent elements in all drawings have the same reference sign. Further, in the description, a reference sign described previously shall be used as needed.

Figure 1:
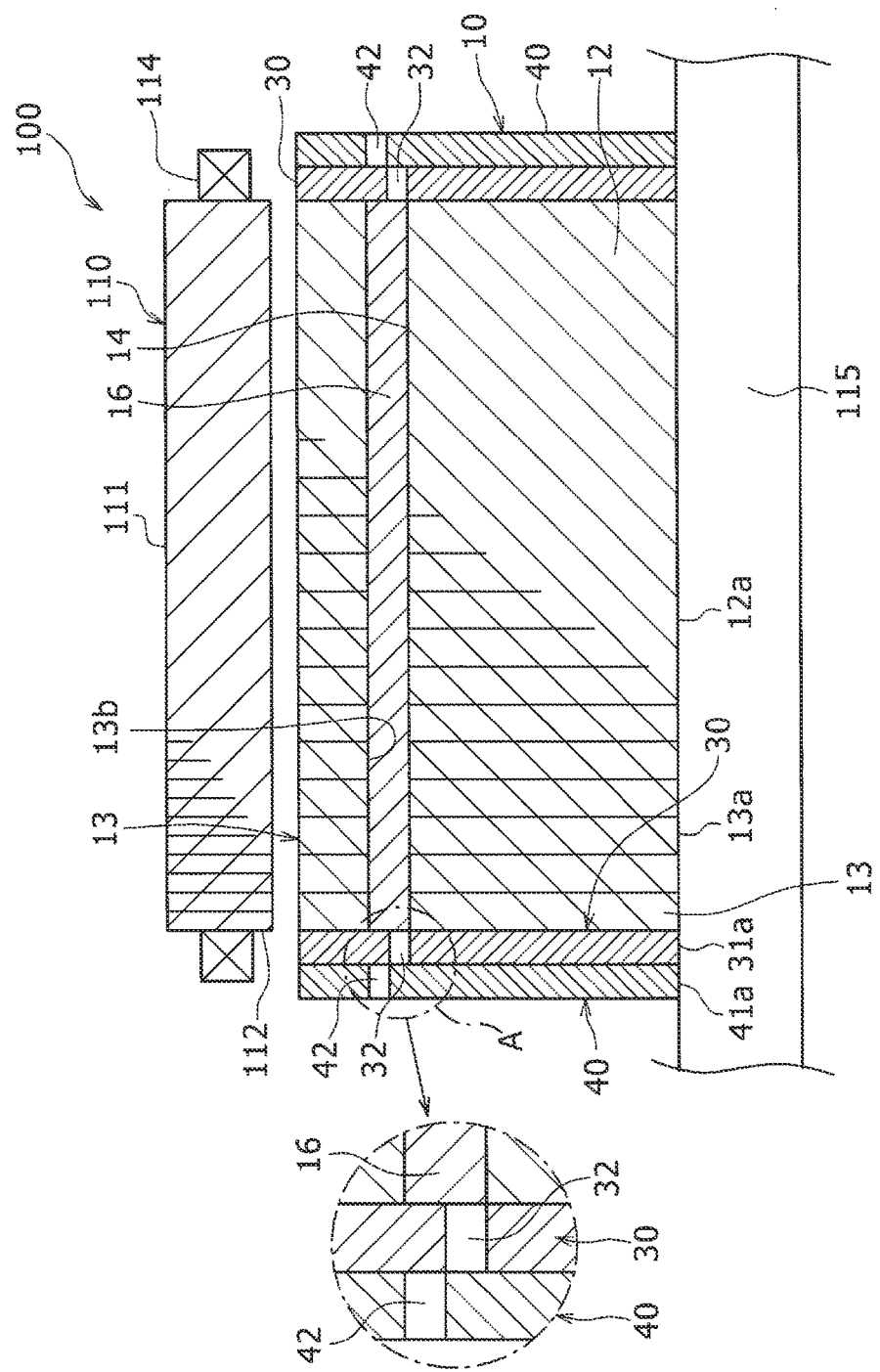
FIG. 1 is a half sectional view of a rotary electric machine including a rotary electric machine rotor of an embodiment of the present disclosure, and an enlarged view of a part A thereof.
Figure 2:
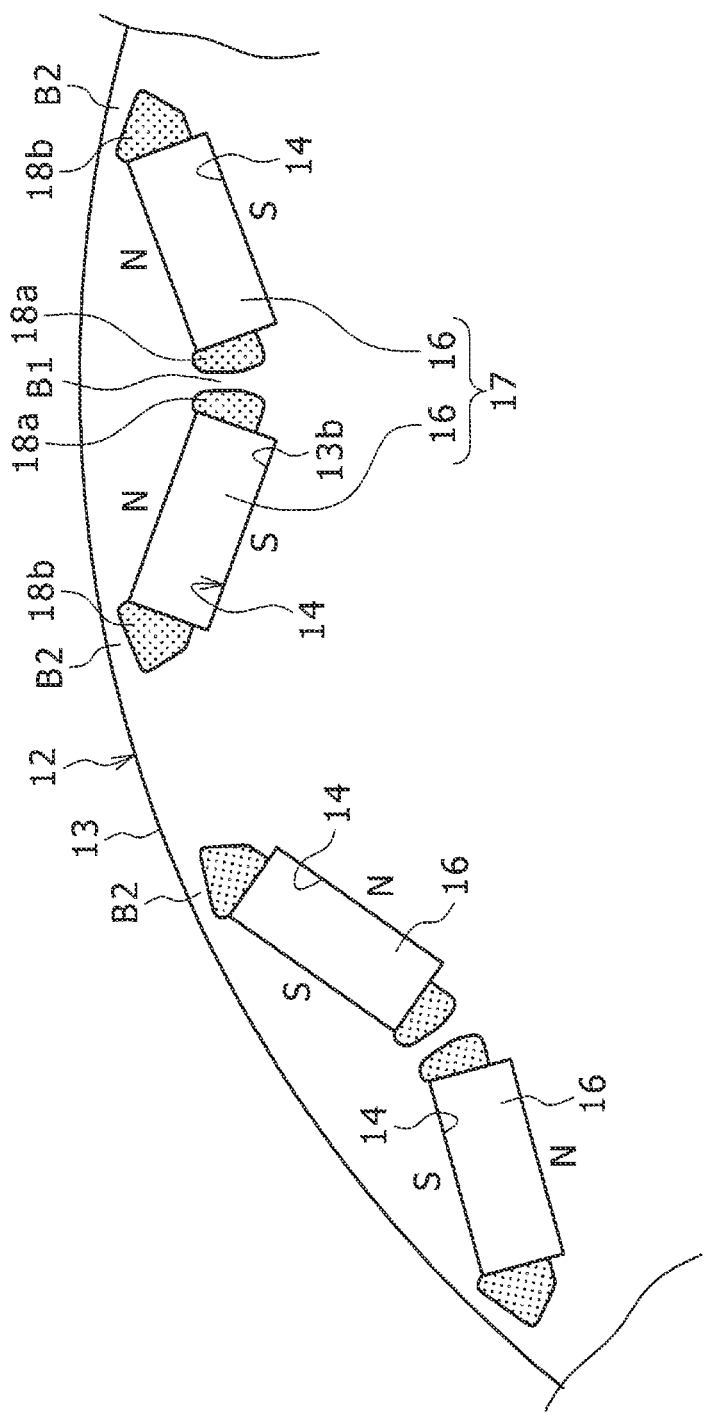
FIG. 2 is a view illustrating a part of a rotor core and a plurality of magnets by removing two end plates from the rotary electric machine rotor in FIG. 1, when viewed from one axial side.

A right drawing in FIG. 1 is a half sectional view of a rotary electric machine 100 including a rotary electric machine rotor 10 of the embodiment, and a left drawing in FIG. 1 is an enlarged view of a part A of the right drawing of FIG. 1. FIG. 2 is a view of a part of a rotor core 12 and a plurality of magnets 16 by removing two end plates 30, 40 from the rotary electric machine rotor 10, when viewed from one axial side. In the following description, the rotary electric machine rotor 10 may be referred to as the rotor 10.

The rotor 10 is used to form the rotary electric machine 100. The rotary electric machine 100 is described with reference to FIG. 1. The rotary electric machine 100 is a permanent-magnet synchronous motor driven by a three-phase alternating current. For example, the rotary electric machine 100 is used as a motor or a generator for driving a hybrid vehicle or as a motor generator having both functions thereof.

The rotary electric machine 100 includes a stator 110, the rotor 10 placed on a radially inner side of the stator 110, and a rotating shaft 115. The stator 110 includes a stator core 111 having a generally tubular shape, and a stator coil 114 wound around a plurality of teeth 112 projecting from an inner peripheral surface of the stator core 111. The stator 110 is fixed to an inner side of a case (not shown).

The rotor 10 is a cylindrical member, and at the time of using the rotor 10, the rotating shaft 115 is inserted inside the rotor 10 and fixed thereto. The rotor 10 is placed inside the case at the time of the use. Inside the case, the rotor 10 is placed opposed to the radially inner side of the stator 110. In this state, both ends of the rotating shaft 115 are rotatably supported by bearings (not shown) with respect to the case. A gap is formed in a radial direction between an outer peripheral surface of the rotor 10 and an inner peripheral surface of the stator 110. Hereby, a rotary electric machine is formed. In the following description, the "radial direction" indicates a radial direction of the rotor 10, and a "circumferential direction" indicates a direction along a circular shape around a central axis of the rotor 10. An "axial direction" indicates a direction along the central axis of the rotor 10.

The rotor 10 includes a rotor core 12, magnets 16, which are permanent magnets embedded in the rotor core 12 at a plurality of positions in the circumferential direction, and two end plates, i.e., a first end plate 30 and a second end plate 40, provided on either axial side of the rotor 10. More specifically, the rotor core 12 is formed by laminating, in the axial direction, a plurality of discoidal core steel sheets 13, which are magnetic materials. A shaft hole 12a is formed in a central part of the rotor core 12, and a plurality of magnet holes 14 is formed in a region near an outer periphery of the rotor 10 around the shaft hole 12a. The rotating shaft 115 is fixed inside the shaft hole 12a. The plurality of magnet holes 14 is formed in the rotor core 12 at the plurality of positions in the circumferential direction so as to extend in the axial direction. The magnets 16 are inserted into the magnet holes 14 in a fixed manner. The first end plate 30 and the second end plate 40 are placed in a laminated manner on either side of the rotor core 12, and the first end plate 30 placed on an inner side is opposed to the magnets 16 and resin portions 18a, 18b for fixation of the magnets 16 (FIG. 2). Hereby, the magnets 16 and the resin portions 18a, 18b can be restrained from protruding in the axial direction. Further, first slits 32, 33 (FIG. 3) (described later) are formed in respective parts, in the first end plate 30, opposed to the magnets 16. Further, the second end plate 40 is laminated on an outer side of the first end plate 30, and second slits 42, 43 (FIG. 4) (described later) are formed in the second end plate 40. When the rotor core 12 is viewed from one axial side, the first slits 32 and the second slits 42 are all placed at different positions to each other, and the first slits 33 and the second slits 43 are all placed at different positions to each other. Hereby, without using a non-magnetic substance for the end plate 30, it is possible to restrain a magnetic flux leakage of the magnets 16 and to increase protrusion prevention performance for the magnets 16. This will be described later, more specifically.

Each of the core steel sheets 13 constituting the rotor core 12 has a disk shape, and is a silicon electromagnetic steel sheet, for example. The core steel sheet 13 is formed such that a thin steel sheet material with a thickness of 0.5 mm or less is punched in an annular shape, for example. In the core steel sheet 13, a shaft hole element 13a at a central part and a plurality of magnet hole elements 13b therearound are formed by the punching.

When the shaft hole elements 13a of the plurality of core steel sheets 13 are connected to each other in the axial direction, the shaft hole 12a of the rotor core 12 is formed. When the plurality of magnet hole elements 13b of the plurality of core steel sheets 13 is connected to each other in the axial direction, the plurality of magnet holes 14 extending in the axial direction of the rotor core 12 is formed in the rotor core 12.

As illustrated in FIG. 2, the plurality of magnet holes 14 in the rotor core 12 is provided in pairs such that two magnet holes 14 in each pair are placed to form a V-shape to be opened radially outwardly (upward in FIG. 2) in combination. The magnet 16 is inserted into each of the magnet holes 14. The magnet 16 has a rectangular shape when viewed from the one axial side, and also has a rectangular solid shape elongated in the axial direction. Further, a space of a rectangular solid shape elongated in the axial direction in an intermediate part of the magnet hole 14 in the circumferential direction is a magnet insertion part into which a magnet is inserted. In the magnet hole 14, the resin portions 18a, 18b extending in the axial direction are placed in at least part of a gap between the magnet hole 14 and the magnet 16. More specifically, right after the magnet 16 is inserted into the magnet insertion part of the magnet hole 14, gaps are formed in both ends of the magnet hole 14. Then, resin as a magnet fixation material is injected into the gaps in a molten state and solidified, so that the resin portions 18a, 18b extending in the axial direction are placed. The magnet 16 is fixed to the rotor core 12 by the resin portions 18a, 18b. In FIG. 2, the resin portions 18a, 18b are indicated by dots.

A magnetization direction of the magnet 16 is a direction perpendicular to an outer peripheral side surface and an inner peripheral surface thereof. The resin injected into the gaps of the magnet hole 14 is heated, for example, so that the magnet 16 is fixed in the magnet hole 14. At this time, the rotor core 12 is heated by a heating device (not shown). After the resin in the molten state is cured by heating, the resin is cooled down to a normal temperature so that the resin portions 18a, 18b are formed.

Two adjacent magnets 16 among the plurality of magnets 16 are provided in one pair such that the one pair of magnets 16 forms one magnetic pole 17. More specifically, two magnets 16 in one pair are placed opposed to each other in a generally V-shape along the arrangement of the plurality of magnet holes 14 so that a distance therebetween is widened toward a radially outer side of the rotor core 12. Hereby, one magnetic pole 17 is formed. In a part illustrated in FIG. 2 in the rotor 10, in a magnetic pole 17 constituted by two magnets 16 on a right side, the magnets 16 are magnetized so that their outer peripheral surfaces become N-poles, and in a magnetic pole 17 constituted by two magnets 16 on a left side, the magnets 16 are magnetized so that their outer peripheral surfaces become S-poles.

Further, in the rotor core 12, one intermediate bridge B1, and two outer bridges B2 are formed with respect to one pair of magnets 16. The intermediate bridge B1 is a small-width flux path formed between respective opposed circumferential ends of two magnet holes 14 with respect to the one pair of magnets 16. The two outer bridges B2 are small-width flux paths each formed between a radial outer end of corresponding one of two magnet holes 14 and an outer peripheral surface of the rotor core 12, with respect to the one pair of magnets 16.

Referring back to FIGS. 1A and 1B, the first end plate 30 and the second end plate 40 are placed in a laminated manner on both axial end surfaces of the rotor core 12, such that the rotor core 12 is sandwiched between sets of two end plates 30, 40. The end plate 30, 40 is fixed by being fitted to the rotating shaft 115 with a tightening margin, or in a state where the end plate 30, 40 is laminated on the rotor core 12, an axial end surface of the end plate is pressed by a caulking jig in the axial direction so as to form a caulking portion, so that the end plate can be fixed to the rotor core. Further, the first end plates 30 are placed opposed to both axial end surfaces of the rotor core 12, and the second end plates 40 are laminated on respective outer sides of the first end plates 30.

Figure 3:
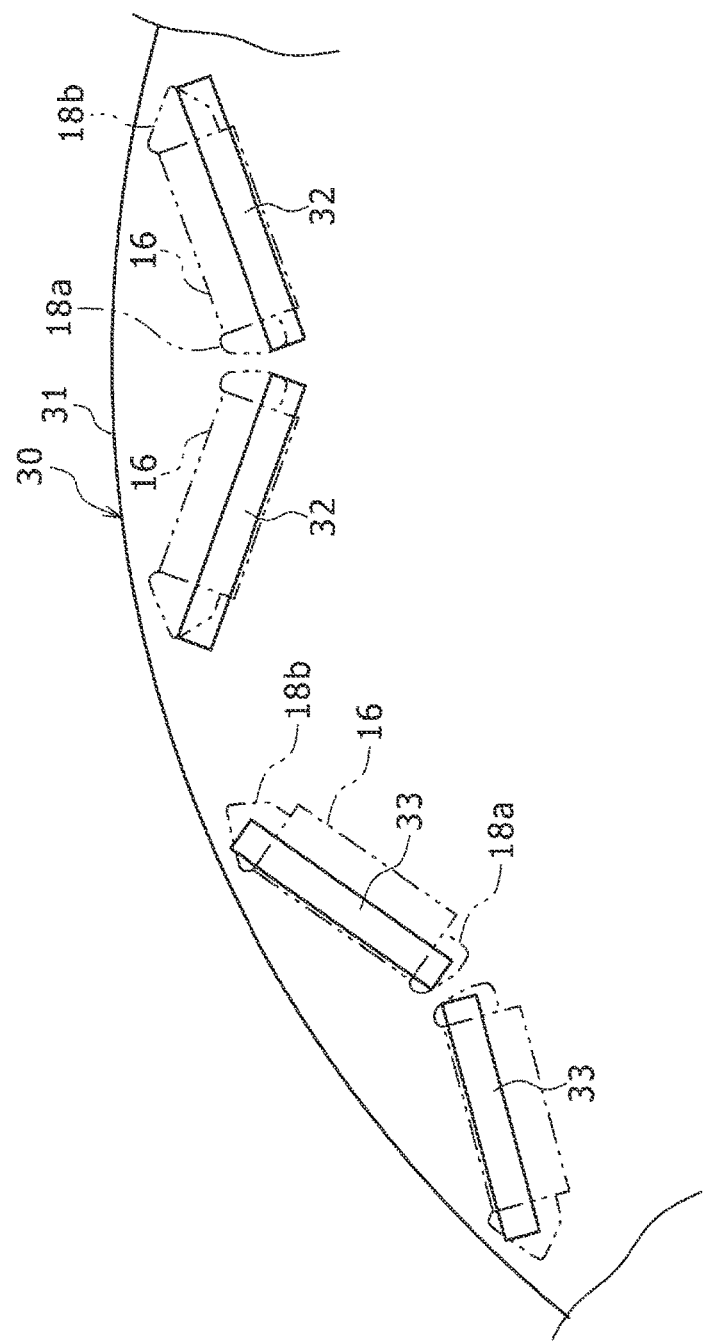
FIG. 3 is a view illustrating a part of a first end plate constituting the rotary electric machine rotor in FIG. 1, when viewed from the one axial side.
Figure 4:
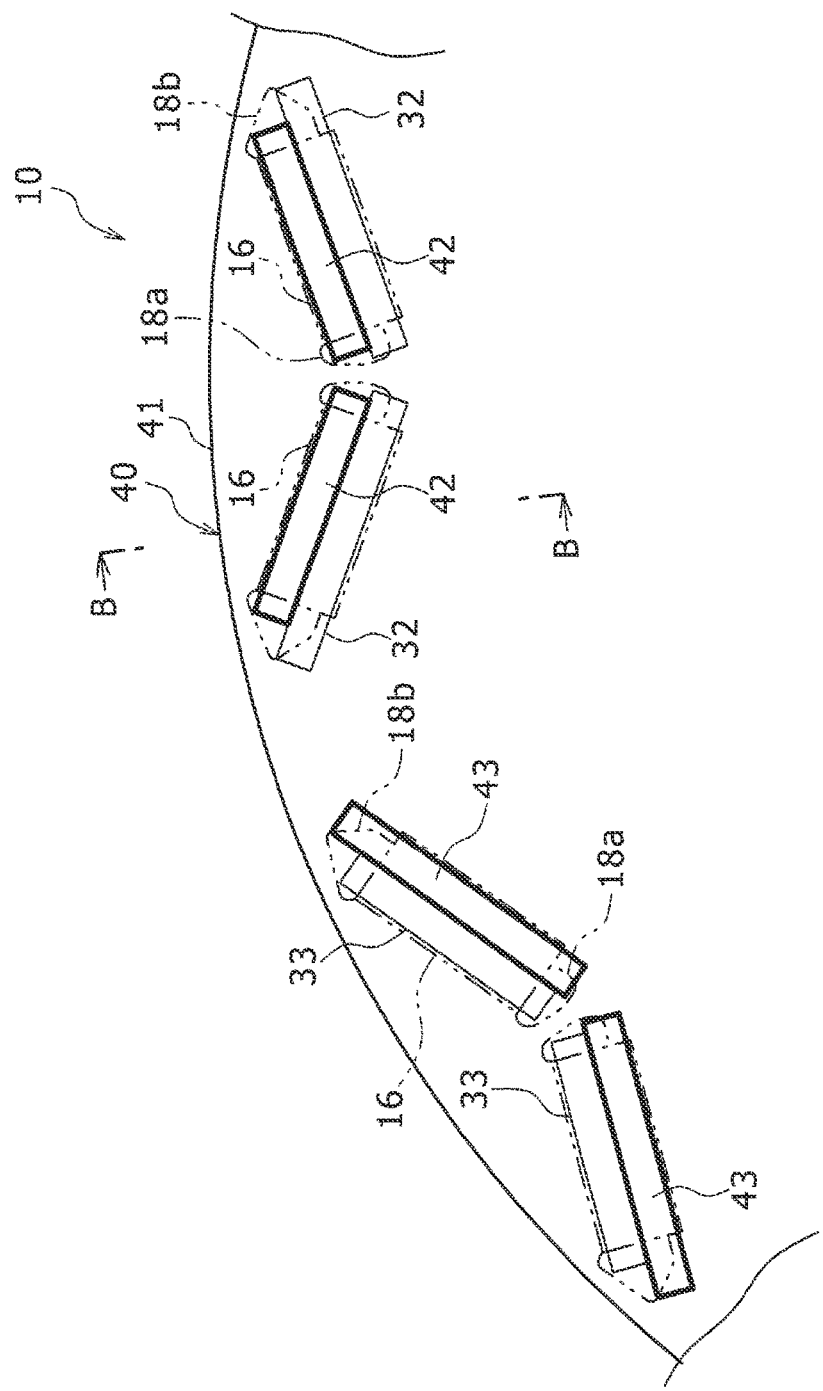
FIG. 4 is a perspective drawing illustrating a part of the rotary electric machine rotor in FIG. 1, when viewed from the one axial side.

FIG. 3 is a view illustrating a part of the first end plate 30, when viewed from the one axial side. FIG. 4 is a perspective drawing of a part of the rotor 10, when viewed from the one axial side.

The following describes the first end plate 30 with reference to FIG. 3. The first end plate 30 is a member made of a magnetic material. More specifically, the first end plate 30 is constituted by a discoidal first steel sheet 31. A shaft hole 31a through which the rotating shaft 115 is passed is formed in a central part of the first steel sheet 31. The first steel sheet 31 is made of the same material as the core steel sheet 13 constituting the rotor core 12, and also has the same thickness as the core steel sheet 13. Hereby, a manufacturing cost of the rotor 10 can be reduced as described later.

Further, in the first end plate 30, at least one first leakage flux restraint hole is formed in a part opposed to the magnet 16. In the embodiment, in the first end plate 30, as the at least one first leakage flux restraint hole (first hole), one first slit 32, 33, which is a hole having an elongated rectangular section, is formed per magnet 16 in a part opposed to the magnet 16 and the resin portions 18a, 18b placed on both ends of the magnet 16.

The first slits 32, 33 are formed in respective parts, in the first end plate 30, opposed to the same radial side of the magnets 16 in one pair along respective longitudinal directions of the magnets 16. Hereby, two first slits 32, 33 opposed to the magnets 16 in one pair are provided in one pair such that the two first slits 32, 33 in the pair are formed in a V-shape along the arrangement of the magnets 16. Further, respective first slits 32, 33 in pairs adjacent to each other in the circumferential direction are formed at positions opposed to opposite radial sides of their corresponding magnets 16. In FIG. 3, the first slits 32 in a right pair are formed in parts opposed to radially inner sides of the magnets 16, and the first slits 33 in a left pair are formed in parts opposed to radially outer sides of the magnets 16. The first slits 32, 33 are formed by punching to punch the first end plate 30 in the axial direction by use of a punch (not shown) for hole machining.

Further, an axial end surface of the magnet 16 and axial end surfaces of the resin portions 18a, 18b are covered with a part of the first end plate 30 in which part the first slit 32, 33 is not formed. For example, in a part where the first slit 32 is formed at a position opposed to the radially inner side of the magnet 16, the axial end surface of the magnet 16 and the axial end surfaces of the resin portions 18a, 18b are covered with a part of the first end plate 30, the part deviating radially outwardly from the first slit 32.

Further, in a part where the first slit 33 is formed at a position opposed to the radially outer side of the magnet 16, the axial end surface of the magnet 16 and the axial end surfaces of the resin portions 18a, 18b are covered with a part of the first end plate 30, the part deviating radially inwardly from the first slit 33. Note that, in the following description, the resin portions 18a, 18b may be collectively referred to as the resin portion 18.

As illustrated in FIG. 4, the second end plate 40 is a member made of a magnetic material. More specifically, the second end plate 40 is constituted by a discoidal second steel sheet 41. The second steel sheet 41 is made of the same material as the core steel sheet 13 constituting the rotor core 12 and the first steel sheet 31 of the first end plate 30, and also has the same thickness thereof. Hereby, the manufacturing cost of the rotor 10 can be reduced as described later. A shaft hole 41a through which the rotating shaft 115 is passed is formed in a central part of the second steel sheet 41.

In a state where the second end plate 40 is laminated on the first end plate 30 and the rotor core 12, at least one second leakage flux restraint hole is formed at a position overlapping with the magnet 16 when viewed from the one axial side. In the embodiment, in the second end plate 40, as the at least one second leakage flux restraint hole (second hole), one second slit 42, 43, which is a hole having an elongated rectangular section, is formed per magnet 16 in a part opposed to the magnet 16 and the resin portions 18 placed on both ends of the magnet 16. In FIG. 4, the second slit 42, 43 formed in the second end plate 40 and illustrated on an outer side is indicated by a thick-line rectangle, and the first slit 32, 33 formed in the first end plate 30 and placed on an inner side so as to be covered with the second end plate 40 is indicated by a thin-line rectangle.

In the present embodiment, the first steel sheet 31 constituting the first end plate 30 and the second steel sheet 41 constituting the second end plate 40 have the same shape.

More specifically, the second end plate 40 has the same outer shape as the first end plate 30, and a shape and a formation position of the slit 42, 43 in the second end plate 40 are the same as the slit 32, 33 in the first end plate 30. In a state where two end plates 30, 40 are laminated, circumferential phases of the end plates 30, 40 are shifted from each other so that the second slit 42, 43 is formed on an opposite radial side of the magnet 16 with respect to the first slit 32, 33. Hereby, in a state where the first end plate and the second end plate 40 are laminated as illustrated in FIG. 4, the slits 32, 33, 42, 43 are formed on opposite radial sides of the magnets 16 at positions opposed to each pair of magnets 16. In this state, when the rotor 10 is viewed from the one axial side, respective intermediate parts of the first slit 32, 33 and the second slit 42, 43 in the circumferential direction overlap with the magnet 16 inside the magnet hole 14. Further, when the rotor 10 is viewed from the one axial side, all the first slits 32, 33 and the second slits 42, 43 are placed at different positions. Further, when the rotor 10 is viewed from the one axial side, both circumferential ends of the first slit 32, 33 and both circumferential ends of the second slit 42, 43 overlap with the resin portions 18a, 18b inside the magnet hole 14. Further, when the rotor 10 is viewed from the one axial side, in parts where the first slits 32, 33 and the second slits 42, 43 overlap with the resin portions 18, the first the slits 32, 33 and the second slits 42, 43 are all placed at different positions.

In the rotor 10, the first slit 32, 33 is formed in the first end plate 30 made of a magnetic material, so as to be opposed to the magnet 16 inside the magnet hole 14. Hereby, a space with a large magnetic resistance is formed in the first slit 32, 33 of the first end plate 30, so that magnetic fluxes can hardly flow in the end plate 30. On this account, it is possible to restrain a magnetic flux leakage from the magnet 16 to the first end plate 30 and a magnetic flux short circuit of the magnet 16 through the first end plate 30. Further, the first end plate 30 covers the axial end surface of the magnet 16. Hereby, it is not necessary to use a non-magnetic substance for the end plate 30, and it is possible to balance restraint of the magnetic flux leakage of the magnet 16 with restraint of protrusion of the magnet 16.

Further, the second end plate 40 is laminated on the outer side of the first end plate 30 such that the first slits 32, 33 and the second slits 42, 43 are all placed at different positions when viewed from the one axial side. Hereby, since the first slits 32, 33 are covered with the second end plate 40, it is possible to restrain the magnets 16 from being exposed. Further, this can increase protrusion prevention performance for the magnets 16. Further, the first steel sheet 31 and the second steel sheet 41, which are made of the same material as the core steel sheet 13 constituting the rotor core, are used for the end plates 30, 40, so that it is possible to restrain the increase of the manufacturing cost. Further, the first steel sheet 31 and the second steel sheet 41 have the same shape and are laminated with different phases in the circumferential direction, which makes it possible to further restrain the increase of the manufacturing cost. Accordingly, it is possible to restrain the manufacturing cost, to restrain a magnetic flux leakage and a magnetic flux short circuit of the magnets 16, and to increase protrusion prevention performance for the magnets 16. Since the magnetic flux leakage and the magnetic flux short circuit can be restrained, more magnetic fluxes emitted from the magnets 16 can flow toward the stator. This makes it possible to restrain a torque decrease and a loss increase in the rotary electric machine 100.

Further, when the rotor 10 is viewed from the one axial side, the first slits 32, 33 and the second slits 42, 43 overlap with the resin portions 18. Further, when the rotor 10 is viewed from the one axial side, in parts where the first slits 32, 33 and the second slits 42, 43 overlap with the resin portions 18, the first slits 32, 33 and the second slits 42, 43 are all placed at different positions. Hereby, restraint of leakage fluxes flowing through parts opposed to the resin portions 18 in the first end plate 30 and the second end plate 40 can be balanced with restraint of protrusion of the resin due to cracks of the resin portions 18.

In a case where the end plate 30 is not opposed to the resin portions 18, if the resin cracks in the resin portions 18 by any chance, some resin may protrude therefrom. In the embodiment, it is possible to restrain the resin from protruding even if the resin cracks.

Figure 5:
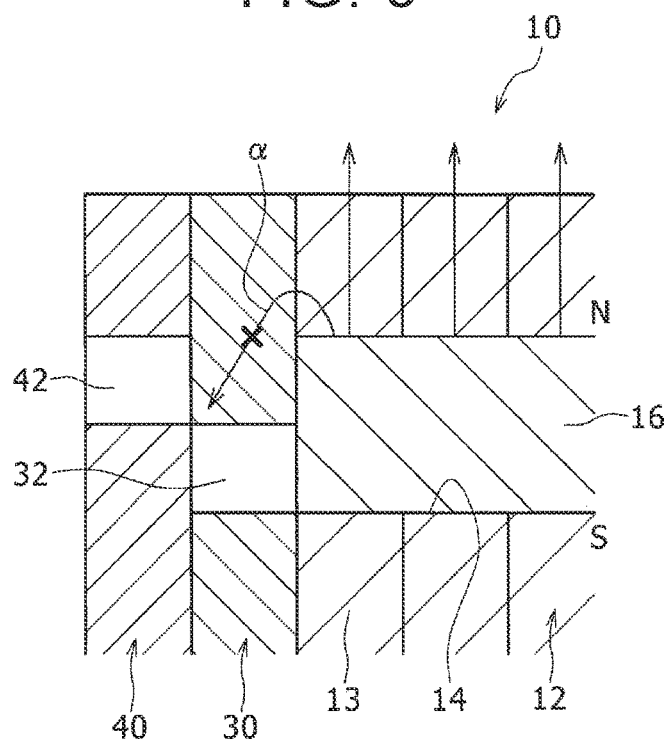
FIG. 5 is a sectional view taken along a line B-B in FIG. 4 so as to describe that a magnetic flux leakage can be restrained in the rotary electric machine rotor of the embodiment of the present disclosure.

FIG. 5 is a sectional view taken along a line B-B in FIG. 4 so as to describe that a magnetic flux leakage can be restrained in the rotor 10 of the embodiment. In the rotor 10 of the embodiment, the first slit 32 of the first end plate 30 and the second slit 42 of the second end plate 40 are placed at different positions, when viewed from one side in the axial direction (a right-left direction in FIG. 5). Hereby, as indicated by an arrow a in FIG. 5, even in a case where some of magnetic fluxes emitted from the N-pole of the magnet 16 tend to leak toward the first end plate 30 side, the presence of the first slit 32 can restrain a leakage flux directed from the radially outer side to the radially inner side. This makes it possible to restrain a magnetic flux short circuit through the first end plate 30 in terms of the magnetic fluxes of the magnet 16.

Figure 6:
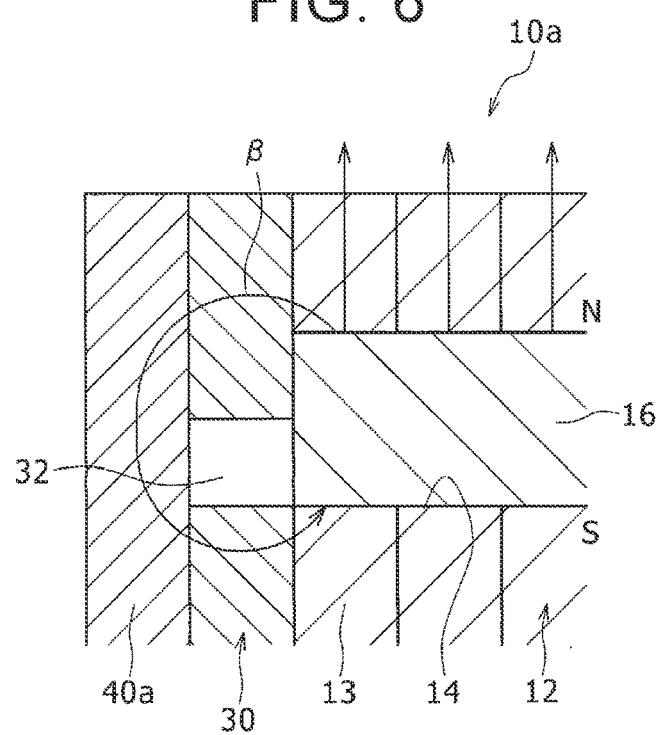
FIG. 6 is a view corresponding to the section along the line B-B in FIG. 4, so as to describe that the magnetic flux leakage occurs in a comparative example of the rotary electric machine rotor.

In the meantime, FIG. 6 is a view corresponding to the section along the line B-B in FIG. 4, so as to describe that a magnetic flux leakage occurs in a rotor 10a as a comparative example. In the comparative example of FIG. 6, a second end plate 40a is laminated on an outer side of a first end plate 30 having a first slit 32. The second end plate 40a just has a shaft hole (not shown) in a central part such that a rotating shaft 115 passes therethrough, and does not have other through-holes penetrating in the axial direction, including the second slit 42 (FIG. 5). In such a comparative example, the following discusses a case where some of magnetic fluxes emitted from an N-pole of a magnet 16 tend to leak toward the first end plate 30 side, as indicated by an arrow β in FIG. 6. In this case, a magnetic flux leaking on a radially outer side relative to the first slit 32 of the first end plate 30 detours around the first slit 32 via the second end plate 40a placed on an axially outer side, so as to be directed toward a radially inner side of the first end plate 30. This decreases a restraint effect of a magnetic flux short circuit through the first end plate in terms of the magnetic fluxes of the magnet. The present embodiment can prevent such inconvenience.

Note that, in the above embodiment, when the rotor 10 is viewed from the one axial side, the first slits 32, 33 of the first end plate 30 and the second slits 42, 43 of the second end plate 40 are all placed at different positions. In the meantime, when the rotor 10 is viewed from the one axial side, only some of the first slits and the second slits may be placed at different positions. In this configuration, since the other first slits and the other second slits are placed in an overlapped manner in the axial direction, some magnets 16 are exposed outside through such overlapped parts. In the meantime, in this configuration, when the rotor is viewed from the one axial side, it is possible to restrain the magnets from being exposed in comparison with the case where all the first slits and the second slits overlap with each other.

Thus, this configuration can also increase protrusion prevention performance for the magnets.

Further, in the above embodiment, when the rotor 10 is viewed from the one axial side, the slits in the end plates 30, 40 can be formed in parts that overlap with only the magnets 16 among the magnets 16 and the resin portions 18. In this case, an effect of the end plates to restrain a magnetic flux leakage flowing in parts opposed to the resin portions 18 is low, but an effect to restrain protrusion of the resin portions 18 can be increased.

Figure 7:
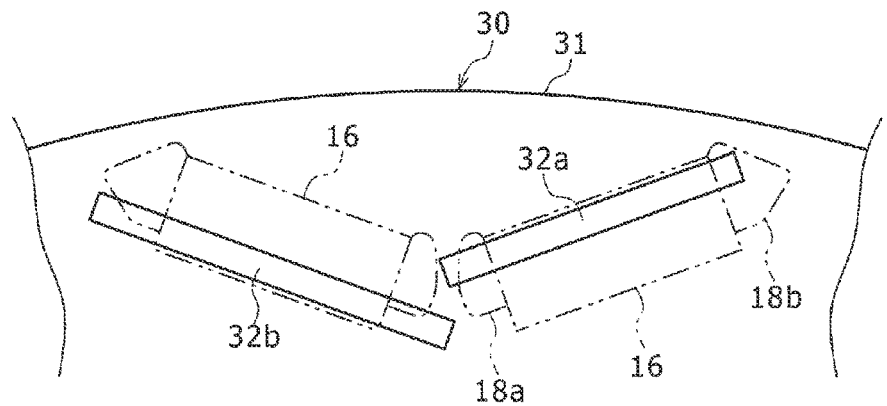
FIG. 7 is a view illustrating a part of the first end plate in a circumferential direction in another example of the embodiment of the present disclosure, when viewed from the one axial side.
Figure 8:
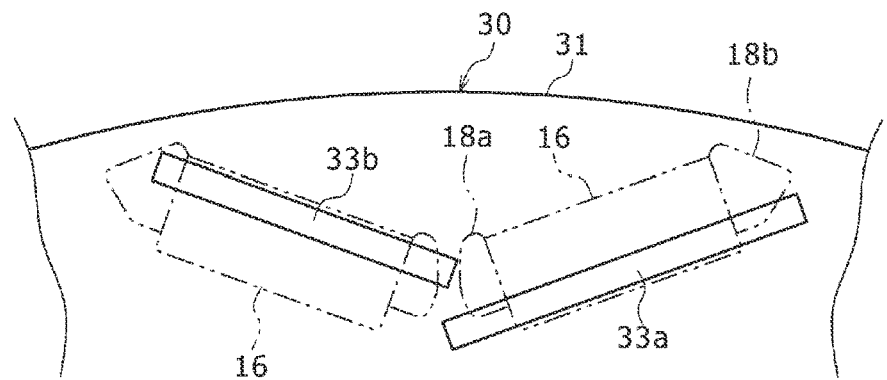
FIG. 8 is a view illustrating another part (different from the part in FIG. 7) of the first end plate in the circumferential direction in another example of the embodiment of the present disclosure, when viewed from the one axial side.
Figure 9A:
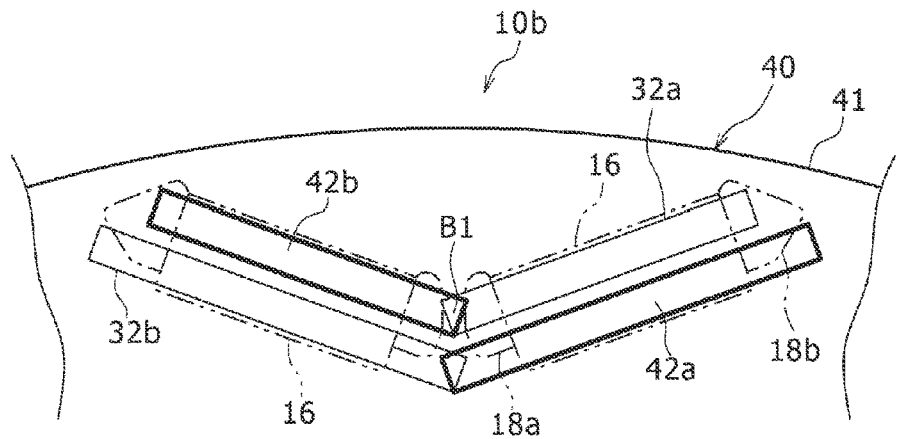
FIG. 9A is a view illustrating a part with the same phase in the circumferential direction as in FIG. 7 in a rotary electric machine rotor of another example of the embodiment of the present disclosure, when viewed from the one axial side.
Figure 9B:
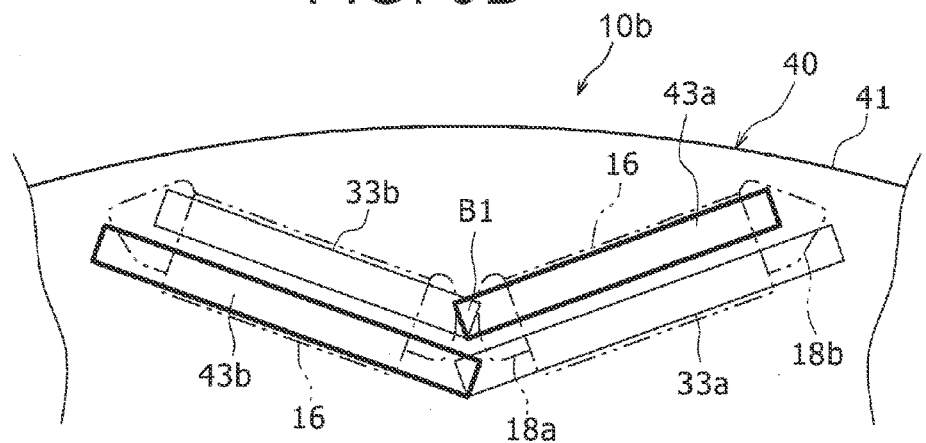
FIG. 9B is a view illustrating a part with the same phase in the circumferential direction as in FIG. 8 in the rotary electric machine rotor of another example of the embodiment of the present disclosure, when viewed from the one axial side.

FIG. 7 is a view illustrating a part of a first end plate 30 in the circumferential direction in another example of the embodiment, when viewed from the one axial side. FIG. 8 is a view illustrating another part (different from the part in FIG. 7) of the first end plate 30 in the circumferential direction in another example of the embodiment, when viewed from the one axial side. FIG. 9A is a view illustrating a part of a rotor 10b of another example of the embodiment, the part with the same circumferential phase as in FIG. 7, when viewed from the one axial side. FIG. 9B is a view of a part of the rotor 10b of another example, the part with the same circumferential phase as in FIG. 8, when viewed from the one axial side.

In a configuration of this example, as illustrated in FIG. 7, the first end plate 30 is configured such that a plurality of first slits 32a, 32b, 33a, 33b is formed in parts overlapping with magnets 16 and resin portions 18 on both sides thereof, when viewed from the one axial side. The first slits 32a, 32b, 33a, 33b are formed in respective parts opposed to opposite sides, in the radial direction, of two magnets 16 provided in the same pair along respective longitudinal directions of the magnets 16. In a part of the first end plate 30 in the circumferential direction as illustrated in FIG. 7, the first slit 32a on the right side in FIG. 7, out of the slits 32a, 32b provided in one pair, is formed in a part opposed to a radially outer side of the magnet 16. The first slit 32b on the left side in FIG. 7 is formed in a part opposed to a radially inner side of the magnet 16.

In the meantime, as illustrated in FIG. 8, out of the slits 33a, 33b provided at a circumferential position different from FIG. 7 as a pair circumferentially adjacent to the slits 32a, 32b in the pair of FIG. 7, the first slit 33a on the right side in FIG. 8 is formed in a part opposed to a radially inner side of the magnet 16. The first slit 33b on the left side in FIG. 8 is formed in a part opposed to a radially outer side of the magnet 16.

Hereby, two first slits 32a, 32b, 33a, 33b opposed to one pair of the magnets 16 are provided in one pair, and the two first slits 32a, 32b, 33a, 33b in each pair are formed in a V-shape along the arrangement of the magnets 16. In the first end plate 30, pairs of two first slits 32a, 32b and pairs of two first slits 33a, 33b are placed alternately in the circumferential direction.

Further, a second end plate 40 is laminated on an outer side of the first end plate 30. As illustrated in FIGS. 9A, 9B, the second end plate 40 is configured such that a plurality of second slits 42a, 42b, 43a, 43b is formed in parts overlapping with the magnets 16 and the resin portions 18 on both sides thereof, when viewed from the one axial side. In FIGS. 9A, 9B, the second slits 42a, 42b, 43a, 43b are indicated by a thick-line rectangle, while the first slits 32a, 32b, 33a, 33b are indicated by a thin-line rectangle. The second slits 42a, 42b, 43a, 43b are formed in respective parts opposed to opposite sides, in the radial direction, of the magnets 16 provided in the same pair along respective longitudinal directions of the magnets 16. FIG. 9A illustrates a part of the second end plate 40, the part with the same phase as a circumferential part of the first end plate 30 illustrated in FIG. 7. FIG. 9B illustrates a part of the second end plate 40, the part with the same phase as a circumferential part of the first end plate 30 illustrated in FIG. 8. In a circumferential part of the second end plate 40 as illustrated in FIG. 9A, the second slit 42a on the right side in FIG. 9A is formed in a part opposed to a radially inner side of the magnet 16. Further, the second slit 42b on the left side in FIG. 9A is formed in a part opposed to a radially outer side of the magnet 16.

Further, in a circumferential part of the second end plate 40 as illustrated in FIG. 9B, the second slit 43a on the right side in FIG. 9B is formed in a part opposed to a radially outer side of the magnet 16. Further, the second slit 43b on the left side in FIG. 9B is formed in a part opposed to a radially inner side of the magnet 16.

Further, when the rotor 10b is viewed from the one axial side, respective parts of the magnets and the resin portions, to which the first slits 32a, 32b, 33a, 33b of the first end plate 30 and the second slits 42a, 42b, 43a, 43b of the second end plate 40 are opposed, are all different from each other. In the meantime, in the example of FIGS. 9A and 9B, the first slit and the second slit partially overlap with each other in a part opposed to a part (e.g., an intermediate bridge B1 or the like) of the rotor core other than the magnets 16 and the resin portions 18, when viewed from the one axial side. Even if there is an overlapped portion between the first slit and the second slit in this part, this does not affect restraint of protrusion of the magnets and the resin portions. Besides, the overlapped portion can further restrain a magnetic flux leakage.

Further, in the configuration of this example, a first steel sheet 31 constituting the first end plate 30 and a second steel sheet 41 constituting the second end plate 40 have the same shape. On this account, the second end plate 40 has the same outer shape as the first end plate 30, and a shape and a formation position of the second slits 42a, 42b, 43a, 43b are also the same as the first slits 32a, 32b, 33a, 33b of the first end plate 30. In a state where two end plates 30, 40 are laminated, circumferential phases of the end plates 30, 40 are shifted from each other so that the second slit is formed on an opposite radial side of the magnet 16 with respect to the first slit.

Even with the configuration, an effect similar to the configuration from FIGS. 1A to 5 is also obtained. Other configurations and effects are the same as in the configuration of FIGS. 1A to 5.

Figure 10:
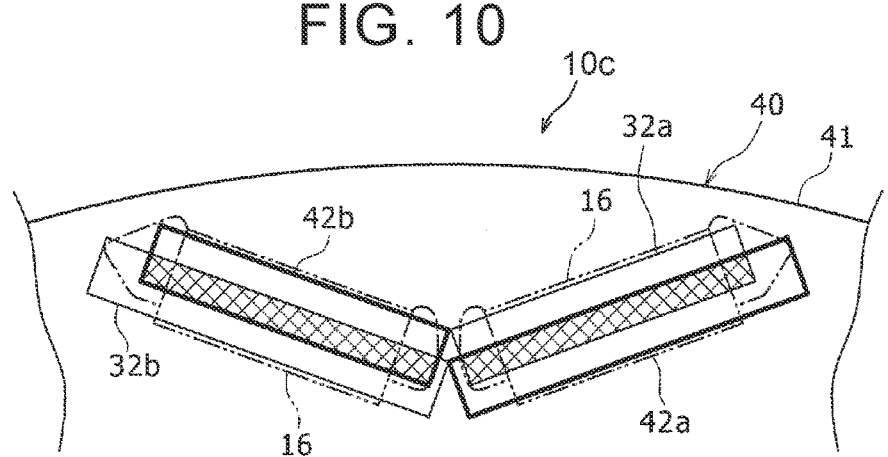
FIG. 10 is a view illustrating a part of a rotary electric machine rotor of another example of the embodiment of the present disclosure, when viewed from the one axial side, and corresponds to FIG. 9A.

FIG. 10 is a view illustrating a part of a rotor 10c of another example of the embodiment, when viewed from one axial side, and corresponds to FIG. 9A. In a configuration of this example, in addition to the configuration from FIGS. 7 to 9B, when the rotor 10c is viewed from the one axial side, a first slit 32a, 32b of the first end plate 30 and a second slit 42a, 42b of the second end plate 40 partially overlap with each other for each magnet 16. In FIG. 10, a part where the first slit and the second slit overlap with each other is indicated by an oblique lattice portion. Accordingly, the magnet 16 is exposed in the oblique lattice portion. In such a configuration, the magnet 16 is partially exposed outside. However, it is possible to restrain the magnets 16 from being exposed, in comparison with a case where all the first slits and the second slits fully overlap with each other when viewed from the one axial side. Further, in this case, it is possible to further restrain a magnetic flux leakage and a magnetic flux short circuit. Other configurations and effects are the same as in the configuration of FIGS. 7 to 9B.

Figure 11:
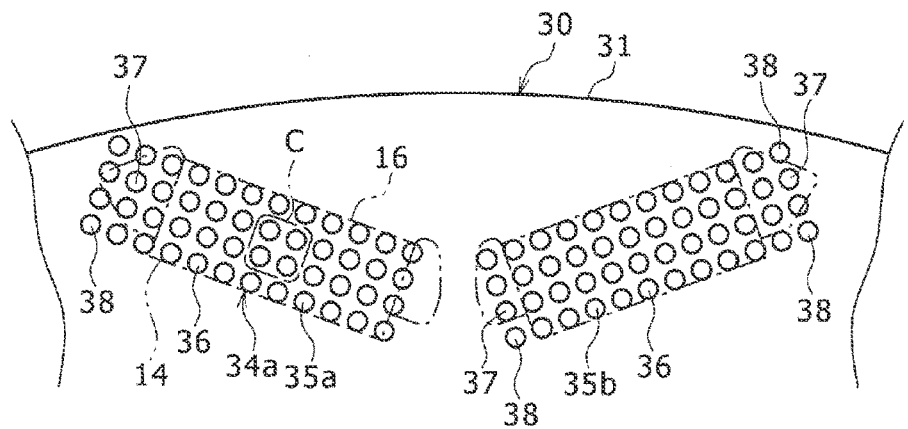
FIG. 11 is a view illustrating a part of a first end plate in the circumferential direction in another example of the embodiment of the present disclosure, when viewed from the one axial side.
Figure 12:
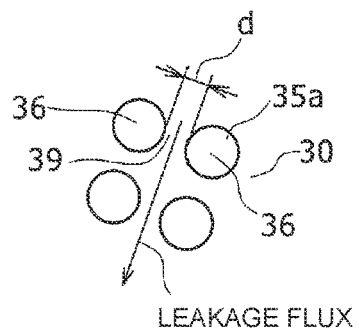
FIG. 12 is an enlarged view of a part C in FIG. 11.
Figure 13:
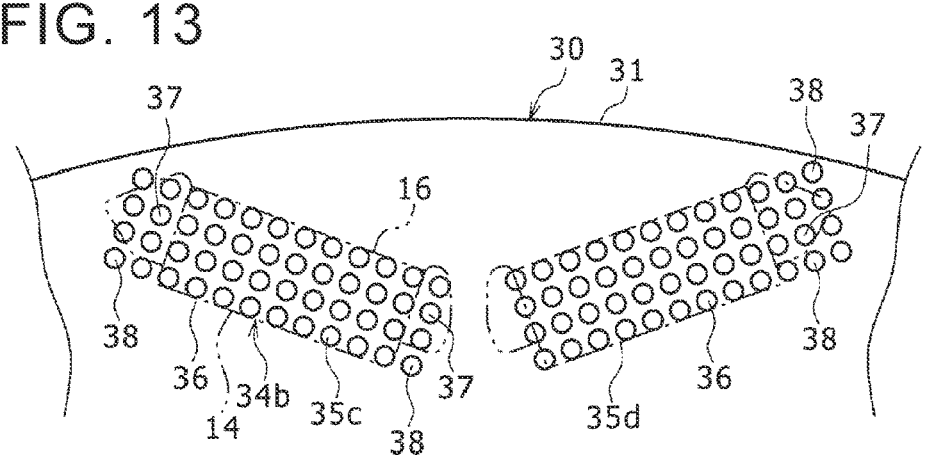
FIG. 13 is a view of another part (different from the part in FIG. 11) of the first end plate in the circumferential direction in another example of the embodiment of the present disclosure, when viewed from the one axial side.
Figure 14:
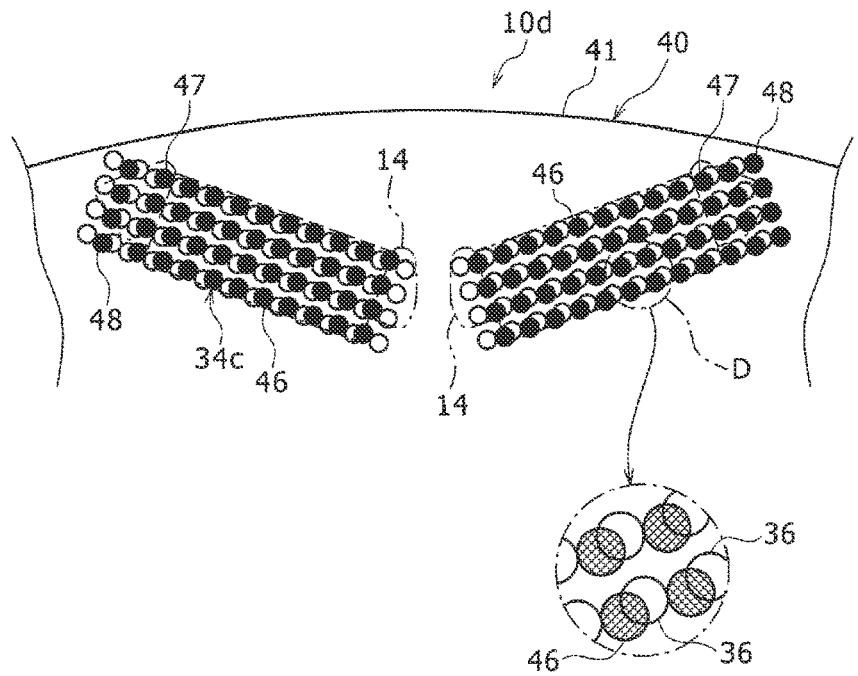
FIG. 14 is a view of a part of a rotary electric machine rotor in another example of the embodiment of the present disclosure, when viewed from the one axial side, and an enlarged view of a part D thereof.

FIG. 11 is a view illustrating a part of a first end plate 30 in a circumferential direction in another example of the embodiment, when viewed from the one axial side. FIG. 12 is an enlarged view of a part C in FIG. 11. FIG. 13 is a view illustrating another part (different from the part in FIG. 11) of the first end plate 30 in the circumferential direction in another example of the embodiment, when viewed from the one axial side. An upper drawing of FIG. 14 is a view illustrating a part of a rotor 10d of another example of the embodiment, when viewed from one axial side, and a lower drawing of FIG. 14 is an enlarged view of a part D in the upper drawing of FIG. 14.

In a configuration of this example, no slit is formed in the end plates 30, 40. Instead of this, in this example, a plurality of first pin holes 36 is formed in a part opposed to a magnet 16 in the first end plate 30 as at least one first leakage flux restraint hole. Further, a plurality of first pin holes 46 (FIG. 14) is formed in a part opposed to a magnet 16 in the second end plate 40 as at least one second leakage flux restraint hole.

More specifically, as illustrated in FIGS. 11, 13, a first V-shaped hole group 34a and a second V-shaped hole group 34b are formed at a plurality of positions of the first end plate 30 in the circumferential direction. The first V-shaped hole group 34a illustrated in FIG. 11 is formed such that two pin hole groups 35a, 35b are placed in a V-shape along an arrangement position of the V-shaped magnet holes 14 (FIG. 2) of the rotor core 12. The second V-shaped hole group 34b illustrated in FIG. 13 is formed such that two pin hole groups 35c, 35d are placed in a V-shape along an arrangement position of the V-shaped magnet holes 14 of the rotor core 12. In the following description, the pin hole groups 35a, 35b, 35c, 35d may be collectively referred to as the pin hole group 35. The pin hole group 35 is formed such that a plurality of pin holes as very small circular holes is arranged in a rectangular region. More specifically, the pin hole group 35 includes a plurality of first pin holes 36, a plurality of second pin holes 37, and a plurality of third pin holes 38. The plurality of first pin holes 36 is formed in a part opposed to the magnet 16 in the first end plate 30, in a longitudinally intermediate part of the pin hole group 35. The plurality of second pin holes 37 is formed in a part opposed to at least one of resin portions 18a, 18b in the first end plate 30, in a longitudinal end of the pin hole group 35. The plurality of third pin holes 38 is formed in a part not opposed to the magnet 16 and the resin portions 18a, 18b in the first end plate 30, in the longitudinal end of the pin hole group 35. In the embodiment, the first pin hole 36 corresponds to a first leakage flux restraint hole, and the second pin hole 37 corresponds to a third leakage flux restraint hole (third hole).

The plurality of pin holes 36, 37, 38 constituting the pin hole group 35 is placed such that several pin holes among them are aligned generally at regular intervals in a longitudinal direction of the pin hole group 35 and in a width direction perpendicular to the longitudinal direction. The pin holes 36, 37, 38, penetrate the first end plate 30 in the axial direction and all the pin holes 36, 37, 38 have the same diameter. Hereby, a part of the end plate 30 where the pin holes 36, 37, 38 are formed has a mesh shape. The pin holes 36, 37, 38 are formed such that the end plate 30 is punched at a plurality of positions in the axial direction by use of a punch (not shown) for machining of a plurality of holes.

In the first end plate 30, the first V-shaped hole groups 34a and the second V-shaped hole groups 34b are placed alternately in the circumferential direction. Respective pin holes 36, 37, 38 in the V-shaped hole groups 34a, 34b adjacent to each other are placed at different positions in terms of the longitudinal direction of the magnet hole 14. The first V-shaped hole group 34a illustrated in FIG. 11 is shifted from the magnet hole 14 by generally a half pitch of a pin hole distance toward one longitudinal side (the left side in FIGS. 11, 13), which is one circumferential side, as compared to the second V-shaped hole group 34b illustrated in FIG. 13.

Further, an axial end surface of the magnet 16 and axial end surfaces of the resin portions 18a, 18b are covered with parts of the first end plate 30 where the pin holes 36, 37, 38 are not formed.

As illustrated in FIG. 12, in the pin hole group 35, an inter-hole magnetic flux path 39 is formed between adjacent pin holes 36, 37, 38. The inter-hole magnetic flux path 39 is a path through which a leakage flux leaking from the magnet 16 toward the first end plate 30 side might pass at the time of use.

Similarly to the first end plate 30, first V-shaped hole groups 34c and second V-shaped hole groups (not shown) are formed at a plurality of positions of the second end plate 40 (illustrated in FIG. 14) in the circumferential direction, such that the first V-shaped hole groups 34c and the second V-shaped hole groups are placed alternately in the circumferential direction. FIG. 14 illustrate a part of the second end plate 40, the part with the same circumferential phase as a circumferential part of the first end plate illustrated in FIG. 11. The first V-shaped hole group 34c of the second end plate 40 includes a plurality of first pin holes 46, a plurality of second pin holes 47, and a plurality of third pin holes 48. The first pin hole 46 corresponds to a second leakage flux restraint hole, and the second pin hole 47 corresponds to a fourth leakage flux restraint hole (fourth hole). In FIG. 14, the pin hole 46, 47, 48 is indicated by a black circle. In FIG. 14B, the pin hole 46, 47, 48 is indicated by an oblique lattice circle.

In a configuration of this example, a first steel sheet 31 constituting the first end plate 30 and a second steel sheet 41 constituting the second end plate 40 have the same shape, and shapes and formation positions of the pin holes are also the same in the first steel sheet 31 and the second steel sheet 41. In the second end plate 40, an arrangement position of the first V-shaped hole group 34c illustrated in FIG. 14 relative to the magnet hole 14 is the same as the second V-shaped hole group 34b in the first end plate 30 as illustrated in FIG. 13. In the second end plate 40, an arrangement position of the second V-shaped hole group (not shown) relative to the magnet hole is the same as the first V-shaped hole group 34a in the first end plate 30 as illustrated in FIG. 11.

The end plates 30, 40 are placed to have different phases in the circumferential direction so that respective first V-shaped hole groups 34a, 34c are placed at the same circumferential position and respective second V-shaped hole group 34b are placed at the same circumferential position in a state where two end plates 30, 40 are laminated. In this state, when the rotor is viewed from the one axial side, the first end plate 30 and the second end plate 40 have different formation positions of the pin holes in the V-shaped hole groups 34a, 34b, 34c. Further, when the rotor is viewed from the one axial side, the plurality of first pin holes 36, 46 of the first end plate 30 and the second end plate 40 overlaps with the magnet 16. Further, when the rotor is viewed from the one axial side, at least some of the first pin holes 36 in the first end plate 30 are placed at positions different from the first pin holes 46 in the second end plate 40.

Further, when the rotor is viewed from the one axial side, the plurality of second pin holes 37, 47 in the end plates 30, 40 overlap with the resin portions 18. Further, when the rotor is viewed from the one axial side, at least some of the second pin holes 37 in the first end plate 30 are placed at positions different from the second pin holes 47 in the second end plate 40.

In the above configuration, the first pin holes 36 are formed in the first end plate 30 so as to be opposed to the magnet 16, so that a space with a large magnetic resistance is formed in the first pin holes 36 of the first end plate 30, which makes it difficult for a magnetic flux to flow through the first end plate 30. This makes it possible to restrain a magnetic flux leakage and a magnetic flux short circuit. Further, it is not necessary to use a non-magnetic substance for the first end plate 30, and it is possible to balance restraint of the magnetic flux leakage of the magnet 16 with restraint of protrusion of the magnet 16.

Further, in the first end plate 30, the plurality of first pin holes 36 is formed in a part opposed to the magnet 16. Hereby, it is possible to increase a ratio of the first pin holes 36 in a unit area of the first end plate 30, and further, when each first pin hole 36 is made small, it is possible to increase a total number of first pin holes 36. This can increase the number of spaces formed in the part opposed to the magnet, which can highly balance the restraint of the magnetic flux leakage with the restraint of protrusion of the magnet 16. Further, since the first pin hole 36 is a circular hole, a size of the first pin hole 36 can be easily decreased.

Further, the plurality of second pin holes 37 is formed in the first end plate 30 in a part opposed to the resin portion 18. Hereby, it is possible to increase a ratio of the second pin holes 37 in a unit area of the first end plate 30, and further, when each second pin hole 37 is made small, it is possible to increase a total number of second pin holes 37. This makes it possible to balance restraint of a leakage flux flowing through the part opposed to the resin portion 18 in the first end plate 30 with restraint of protrusion of the resin due to a crack of the resin portion 18.

Note that the above description deals with a case where the pin hole 36, 37, 38, 46, 47, 48 is a circular hole, but the pin hole may be a hole in a non-circular shape such as a rectangular shape.

Further, in the embodiment, in terms of the plurality of pin holes 36, 37, 38, 46, 47, 48 in the end plates 30, 40, a pin hole distance d (FIG. 12) corresponding to a width of the inter-hole magnetic flux path 39 can be made small. Hereby, it is possible to restrain a magnetic flux leakage and a magnetic flux short circuit in which a magnetic flux is short-circuited through the inter-hole magnetic flux path 39 without passing through the stator 110 (FIG. 1). It is preferable to limit the pin hole distance d to a predetermined range, which is two to six times of a thickness of the first steel sheet 31 constituting the end plate 30. By limiting the pin hole distance d to be not more than six times of the thickness of the first steel sheet 31, it is possible to largely decrease a magnetic property of the end plate 30 in the inter-hole magnetic flux path 39 in a case where the pin holes 36, 37, 38 are formed by punching. This makes it difficult for the leakage flux to pass through the inter-hole magnetic flux path 39, which can increase a restraining effect of the magnetic flux short circuit.

Figure 15:
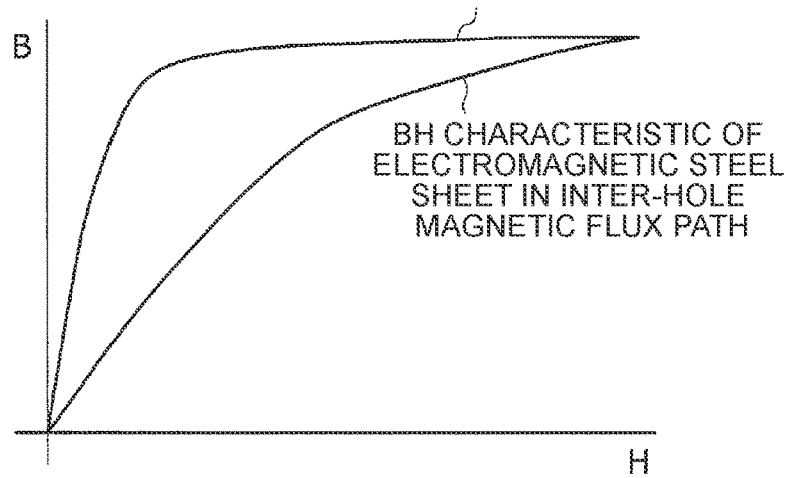
FIG. 15 is a view illustrating a B-H characteristic of a general electromagnetic steel sheet and a B-H characteristic of an electromagnetic steel sheet in an inter-hole magnetic flux path when a pin hole distance is limited to a predetermined range in the embodiment.

FIG. 15 is a view illustrating a B-H characteristic showing a relationship between a magnetic field H and a magnetic flux density B in a general electromagnetic steel sheet and a B-H characteristic of the first steel sheet 31, which is a magnetic steel sheet, in the inter-hole magnetic flux path 39 when the pin hole distance d is limited to the above predetermined range in the embodiment. As illustrated in FIG. 15, the B-H characteristic is indicated by a relationship between a magnetic field H and a magnetic flux density B of a steel sheet magnetized by the magnetic field H. In comparison with the B-H characteristic of the general electromagnetic steel sheet, the B-H characteristic in the embodiment when the pin hole distance d is limited to the predetermined range shows that, particularly in a region with a small magnetic field, an increase of the magnetic flux density B relative to an increase of the magnetic field H is moderate and a magnetic permeability is low. Hereby, it is found that, by limiting the pin hole distance d to the predetermined range, the restraining effect of the magnetic flux short circuit can be increased.

Further, by setting the pin hole distance d to be not less than two times of the thickness of the first steel sheet 31, it is possible to sufficiently increase a shape accuracy of the pin hole 36, 37, 38. The above description deals with the first steel sheet 31 to form the first end plate 30, but this will also apply to the second steel sheet 41 constituting the second end plate 40.

Figure 16:
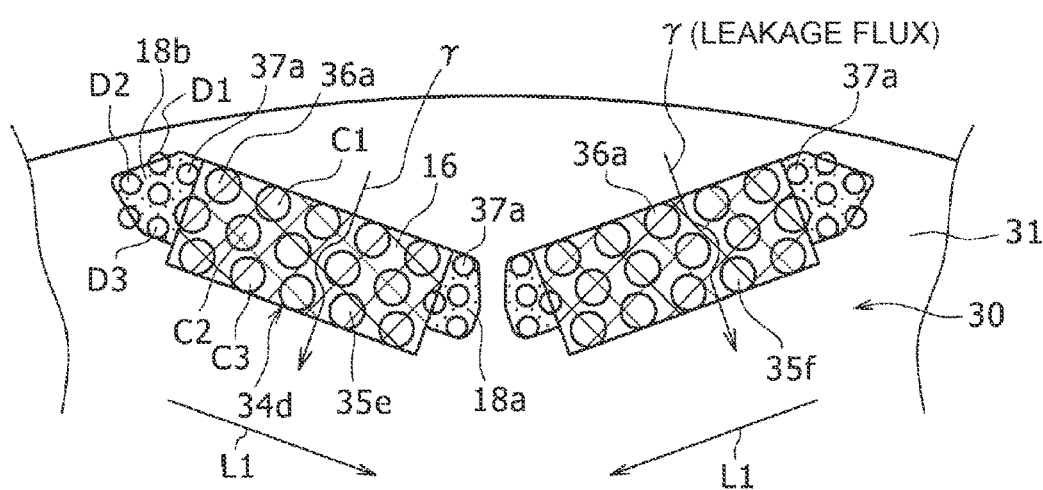
FIG. 16 is a view illustrating a part of a first end plate in the circumferential direction in another example of the embodiment of the present disclosure, when viewed from the one axial side.

FIG. 16 is a view of a part of a first end plate 30 in the circumferential direction in another example of the embodiment, when viewed from the one axial side. In a configuration of this example, a diameter, which is a maximum inner length of a first pin hole 36a in a first V-shaped hole group 34d formed in a first end plate 30, is increased, in comparison with the configuration illustrated in FIGS. 11 to 14. A diameter, which is a maximum inner length of a second pin hole 37a, is made smaller than the diameter of the first pin hole 36a. In the configuration of FIG. 16, a third pin hole 38 (see FIG. 11) is omitted, but the third pin hole may be formed.

Further, in the first end plate 30, a distance between the first pin holes 36a adjacent to each other in a longitudinal direction L1 of a magnet hole in pin hole group 35e, 35f is larger than a distance between the second pin holes 37a adjacent to each other in the longitudinal direction L1 in the pin hole group 35e, 35f.

Further, the plurality of first pin holes 36a is placed in a so-called zigzag manner. More specifically, the plurality of first pin holes 36a is arranged on a straight line in the longitudinal direction L1 in a rectangular region (a part indicated by an oblique lattice in FIG. 16) opposed to an axial end surface of the magnet 16, along a shape of the axial end surface, so as to form one pin hole set C1, C2, C3. A plurality of pin hole sets C1, C2, C3 is placed in a plurality of rows in a divided manner in a direction perpendicular to the longitudinal direction L1. In the pin hole set C1, C2, C3, the plurality of first pin holes 36a is placed generally at regular intervals. Further, the plurality of pin hole sets C1, C2, C3 is configured such that respective positions of respective first pin holes 36a in adjacent pin hole sets C1, C2, C3 along the longitudinal direction L1 deviate from each other. For example, the plurality of pin hole sets C1, C2, C3 is configured such that respective positions of respective first pin holes 36a in adjacent pin hole sets C1, C2, C3 along the longitudinal direction L1 deviate from each other generally by a half pitch. Hereby, the plurality of first pin holes 36a is placed in a zigzag manner.

Further, a plurality of second pin holes 37a placed on outer-diameter side ends of the pin hole group 35e, 35f is placed such that a plurality of pin hole sets D1, D2, D3 is arranged along a direction of the plurality of pin hole sets C1, C2, C3. Further, respective positions of respective second pin holes 37a in adjacent pin hole sets D1, D2, D3 along the longitudinal direction L1 deviate from each other.

FIG. 16 illustrates the first V-shaped hole group 34*d* in a circumferential part of the first end plate 30. However, a second V-shaped hole group (not shown) formed alternately with the first V-shaped hole group 34*d* is formed such that positions of pin holes deviate toward one side in the longitudinal direction of the magnet hole. In the second V-shaped hole group, the shape and arrangement of the pin holes other than that is similar to the first V-shaped hole group 34*d* in FIG. 16, Further, similarly to the first end plate 30, a first V-shaped hole group and a second V-shaped hole group are formed in the second end plate (not shown). A first steel sheet 31 constituting the first end plate 30 and a second steel sheet constituting the second end plate have the same shape, and shapes and formation positions of the pin holes are also the same in the first steel sheet 31 and the second steel sheet. In the second end plate, an arrangement position of the first V-shaped hole group relative to the magnet hole is the same as the second V-shaped hole group in the first end plate 30. In the second end plate, an arrangement position of the second V-shaped hole group relative to the magnet hole is the same as the first V-shaped hole group 34*d* in the first end plate 30. Two end plates 30, 40 are placed so as to have different phases in the circumferential direction so that respective first V-shaped hole groups 34*d* are placed at the same circumferential position and respective second V-shaped hole group are placed at the same circumferential position in a state where the end plates 30, 40 are laminated.

With the configuration, it is possible to achieve restraint of protrusion of resin due to a crack of the resin portion 18, and it is also possible to restrain the number of punches for hole machining of the first pin holes 36*a* and to restrain a magnetic flux leakage. In the meantime, in a configuration where the end plate 30 is not opposed to the resin portion 18 differently from the configuration of the examples, when the resin cracks, a small piece of the resin might protrude from the magnet hole 14. On this account, it is preferable to form the second pin holes 37*a* as small as possible in the part of the first end plate 30, opposed to the resin portion 18, from the viewpoint of restraining protrusion of the resin. In the meantime, a possibility that the magnet 16 protrudes due to a crack is very small as compared to the resin portion 18. Hereby, from the viewpoint of restraining the magnet 16 from protruding, the first pin hole 36*a* opposed to the magnet 16 can be made relatively large assuming that a shape of the axial end surface of the magnet 16 is made smaller. Further, since the first pin hole 36*a* can be made relatively large, it is possible to restrain the number of punches for hole machining of the first pin holes 36*a*, while securing a necessary ratio of the first pin hole 36*a* per unit area to restrain the magnetic flux leakage. This makes it possible to reduce a machining cost of the end plate 30.

Further, in the first end plate 30, the distance between the first pin holes 36*a* adjacent to each other in the longitudinal direction L1 of the magnet hole in the pin hole group 35*e*, 35*f* is larger than the distance between the second pin holes 37*a* adjacent to each other in the longitudinal direction of the magnet hole in the pin hole group 35*e*, 35*f*. Hereby, it is possible to increase a strength of a part of the first end plate 30, the part being opposed to the magnet 16 and having a possibility to be pressed by the magnet 16, and it is possible to increase a restraining effect of the magnetic flux leakage in a part opposed to the resin portion 18, which part does not require a high strength. Other configurations and effects are the same as in the configuration of FIGS. 11 to 15. Note that, in the end plate 30, the distance between the first pin holes 36*a* adjacent to each other in a direction perpendicular to the longitudinal direction L1 in the pin hole group 35*e*, 35*f* may be made larger than a distance between the second pin holes 37*a* adjacent to each other in the direction perpendicular to the longitudinal direction L1 in the pin hole group 35*e*, 35*f*. Further, in the configuration of FIG. 16, only either one of the configuration in which the diameter of the second pin hole 37*a* is made smaller than the diameter of the first pin hole 36*a* and the configuration in which the distance between the first pin holes 36*a* is made larger than the distance between the second pin holes 37*a* may be employed.

Further, in the configuration of FIG. 16, the plurality of first pin holes 36*a* is placed in a zigzag manner. This makes it possible to further decrease the distance between the first pin holes 36*a* in adjacent pin hole sets C1, C2, C3. On this account, the pin hole distance between the first pin holes 36*a* can be easily limited to the range of two to six times of the thickness of the first steel sheet 31. Accordingly, in a case where the first pin holes 36*a* are formed by punching, magnetic properties between the first pin holes 36*a* can be easily decreased. Further, in the first end plate 30, as indicated by an arrow y in FIG. 16, a leakage flux path between the plurality of first pin holes 36*a* becomes a non-linear path that is bent at a plurality of bent portions. Hereby, in the first end plate 30, a length of the leakage flux path between the plurality of first pin hole 36*a* can be increased. This makes it possible to further restrain the occurrence of the magnetic flux short circuit through the first end plate 30, thereby making it possible to restrain a torque decrease and a loss increase in the rotary electric machine.

Further, since the plurality of second pin holes 37*a* positioned on the outer-diameter side ends of the pin hole group 35*e*, 35*f* is also placed in a zigzag manner, the distance between adjacent second pin holes 37*a* can be decreased similarly to the first pin holes 36*a*. This makes it possible to easily decrease magnetic properties between the second pin holes 37*a* and to increase a length of a leakage flux path, thereby making it possible to further restrain the occurrence of the magnetic flux short circuit through the end plate 30. Other configurations and effects are the same as in the configuration illustrated in FIGS. 11 to 15. Note that, in the configuration of this example, the first pin holes and the second pin holes can be set to have the same size and the same distance.

Figure 17:
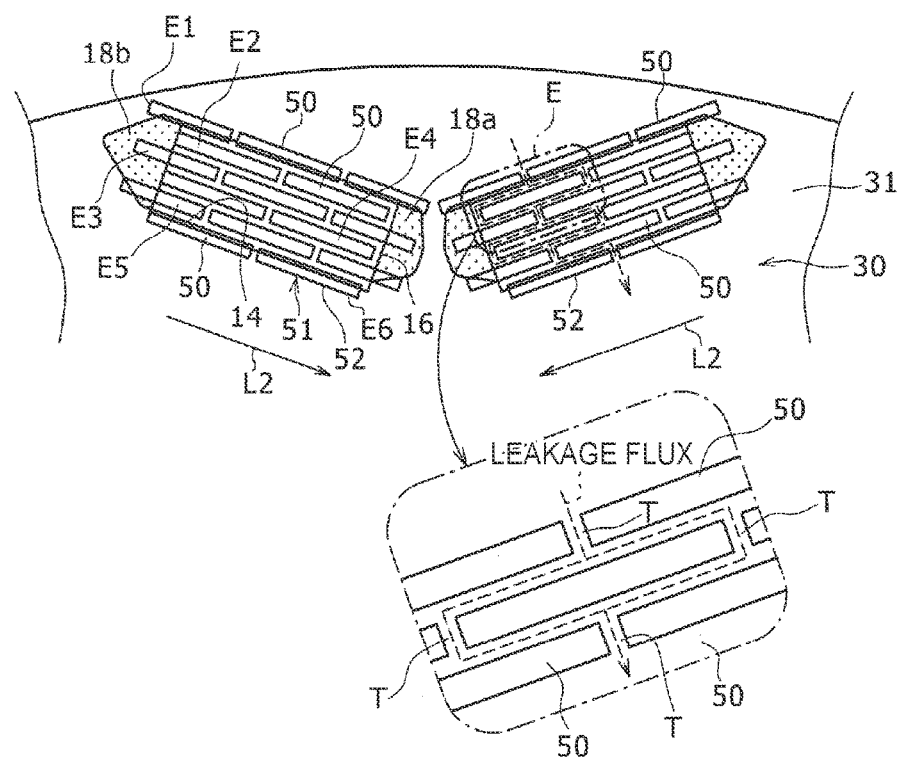
FIG. 17 is a perspective drawing illustrating a part in the circumferential direction in a state where a second end plate is removed from a rotary electric machine rotor in another example of the embodiment of the present disclosure, when viewed from the one axial side, and an enlarged view of a part E thereof.
Figure 18:
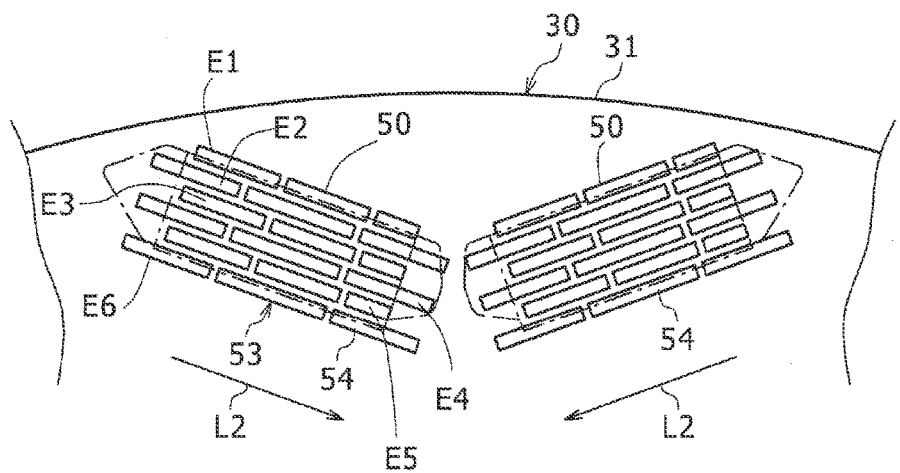
FIG. 18 is a view illustrating another part (different from the part in FIG. 17) of a first end plate in the circumferential direction in another example of the embodiment of the present disclosure, when viewed from the one axial side.
Figure 19:
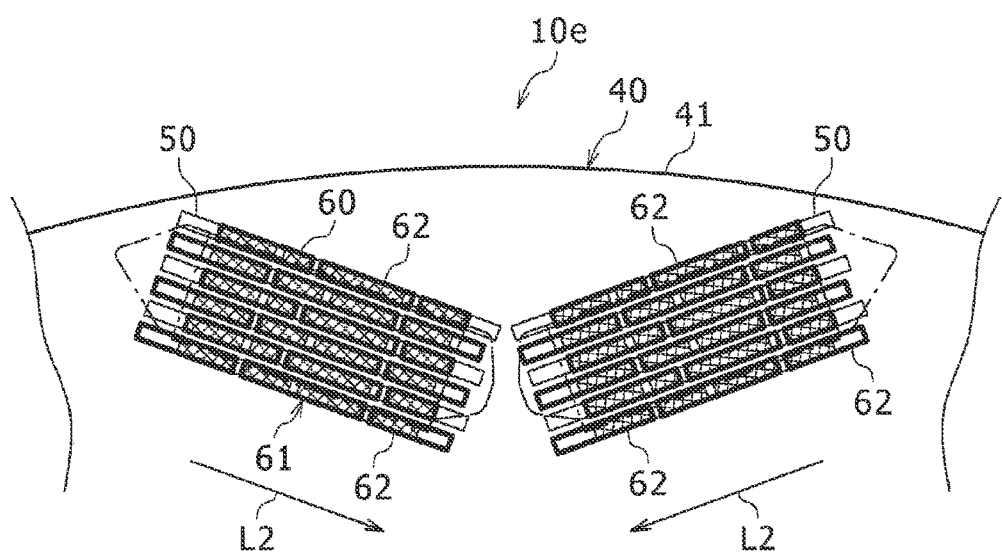
FIG. 19 is a perspective drawing illustrating a part of the rotary electric machine rotor in another example of the embodiment of the present disclosure, when viewed from the one axial side.

An upper drawing of FIG. 17 is a perspective drawing of a part in the circumferential direction in a state where a second end plate 40 is removed from a rotor in another example of the embodiment, when viewed from the one axial side, and a lower drawing of FIG. 17 is an enlarged view of a part E in the upper drawing of FIG. 17. FIG. 18 is a view of another part (different from the part in FIG. 17) of a first end plate 30 in the circumferential direction in another example of the embodiment, when viewed from the one axial side. FIG. 19 is a perspective drawing of a part of a rotor 10*e* in another example of the embodiment, when viewed from the one axial side.

Differently from the configurations of the above examples, in a configuration of this example, a plurality of first slits 50 as elongated holes is formed in the first end plate 30 illustrated FIGS. 17, 18 as a plurality of first leakage flux restraint holes. Further, in the second end plate 40 illustrated in FIG. 19, a plurality of second slits 60 is formed as a plurality of second leakage flux restraint holes. More specifically, first V-shaped hole groups 51 and second V-shaped hole groups 53 are formed at a plurality of positions of the first end plate 30 in the circumferential direction. The first V-shaped hole groups 51 and the second V-shaped hole groups 53 are placed alternately in the circumferential direction of the first end plate 30. FIG. 17 illustrates the first V-shaped hole group 51 of the first end plate 30, and FIG. 18 illustrates the second V-shaped hole group 53 of the first end plate 30. In each of the V-shaped hole groups 51, 53, two slit groups 52, 54 are placed in a V-shape along an arrangement position of the V-shaped magnet holes 14 of the rotor core 12 (FIG. 2). The slit group 52, 54 includes a plurality of first slits 50, and the first slits 50 are formed in a part opposed to a magnet 16 in the first end plate 30.

In the slit group 52, 54, the plurality of slits 50 is arranged on a straight line along a longitudinal direction L2 so as to form one slit set E1, E2 . . . E6. The plurality of slit sets E1, E2, . . . E6 is placed in a plurality of rows in a divided manner in a direction perpendicular to the longitudinal direction L2, and positions of adjacent slits sets E1, E2, . . . E6 in a longitudinal direction of the slit 50 deviate from each other. Hereby, flux paths T are formed between slits 50 adjacent to each other in the longitudinal direction L2 in respective slit sets E1, E2, . . . E6, such that the flux paths T between adjacent slit sets E1, E2, . . . E6 are placed at different positions in terms of a direction parallel to a straight line where the slits 50 are positioned. A distance of the flux path T between the slits 50 along the longitudinal direction L2 is generally the same. Further, some slits 50 among the plurality of slits 50 are also placed in parts opposed to resin portions 18 in the end plate 30. The slits 50 can be formed by punching using a punch for hole machining.

Further, the first V-shaped hole group 51 illustrated in FIG. 17 and the second V-shaped hole group 53 illustrated in FIG. 18 are different from each other in the positions of the slits 50 along the longitudinal direction L2 in each slit group.

Further, similarly to the first end plate 30, first V-shaped hole groups 61 and second V-shaped hole groups (not shown) are formed in the second end plate 40 at a plurality of positions in the circumferential direction, such that the first V-shaped hole groups 61 and the second V-shaped hole groups are placed alternately in the circumferential direction. FIG. 19 illustrates a part of the second end plate 40, the part with the same circumferential phase as a circumferential part of the first end plate 30 illustrated in FIG. 17. The first V-shaped hole group 61 of the second end plate 40 includes two slit groups 62, and each of the slit groups 62 includes a plurality of second slits 60. In FIG. 19, the second slits 60 formed in the second end plate 40 are indicated by a thick-line rectangle, and the first slits 50 formed in the first end plate 30 are indicated by a thin-line rectangle.

A first steel sheet 31 constituting the first end plate 30 and a second steel sheet 41 constituting the second end plate 40 have the same shape, and shapes and formation positions of the slits are also the same in the first steel sheet 31 and the second steel sheet 41. In the second end plate 40, an arrangement position of the first V-shaped hole group 61 relative to the magnet hole is the same as the second V-shaped hole group 53 in the first end plate 30. In the second end plate 40, an arrangement position of the second V-shaped hole group (not shown) relative to the magnet hole is the same as the first V-shaped hole group 51 in the first end plate 30. Two end plates 30, 40 are placed so as to have different phases in the circumferential direction so that respective first V-shaped hole groups 51, 61 are placed at the same circumferential position and respective second V-shaped hole groups 53 are placed at the same circumferential position in a state where the two end plates 30, 40 are laminated. In this state, the first end plate 30 and the second end plate 40 have different formation positions of the slits 50, 60 in the V-shaped hole groups 51, 61, 53. Hereby, when the rotor is viewed from the one axial side, the plurality of slits 50, 60 in the end plates 30, 40 overlap with the magnets 16. Further, when the rotor is viewed from the one axial side, at least some of the slits 50 in the first end plate 30 are placed at positions different from the slits 60 in the second end plate 40. In FIG. 19, a part where the slits 50, 60 of the first end plate 30 and the second end plate 40 overlap with each other when the rotor is viewed from the one axial side is indicated by an oblique lattice portion. Further, in a part where the slits 50, 60 in the end plates 30, 40 overlap with the resin portion 18 when the rotor is viewed from the one axial side, the first slits 50 in the first end plate 30 are placed at positions different from the second slits 60 in the second end plate 40.

With the configuration, it is possible to restrain a magnetic flux leakage and a magnetic flux short circuit of the magnets 16, similarly to the configurations of the above examples. Further, the effect to restrain protrusion of the magnets 16 and the resin can be increased.

Further, as illustrated by a broken arrow in FIG. 17, when a leakage flux passes between the plurality of first slits 50 of the first end plate 30, a path of the magnetic flux is obstructed by the first slit 50 on a front side in a travelling direction of the magnetic flux, so that the magnetic flux bends. This increases a length of a leakage flux path, thereby making it possible to more effectively restrain the magnetic flux short circuit. The same effect can be obtained by the second slits 60 of the second end plate 40. Other configurations and effects are the same as in the configuration of FIGS. 1 to 5.

Note that the configurations of the examples deal with a case where the first end plate 30 and the second end plate 40 are laminated in a state where their respective phases in the circumferential direction are made different from each other. Meanwhile, the first end plate and the second end plate may be laminated in a state where their front and back sides are placed upside down, that is, they are laminated in a reversed manner. For example, in the configuration illustrated in FIGS. 7 to 9B, in the first end plate 30, the V-shaped arrangement of the slits 32a, 32b illustrated in FIG. 7 may be formed at a plurality of positions in the circumferential direction. At this time, in the second end plate 40, a V-shaped arrangement similar to the V-shaped arrangement of the slits 33a, 33b illustrated in FIG. 8 may be formed at a plurality of positions in the circumferential direction. The V-shaped arrangements of the slits 32a, 32b, 33a, 33b of FIGS. 7 and 8 accord with each other in a state where the first end plate 30 is placed in a reversed manner. On this account, steel sheets having the same shape are used for a first steel sheet constituting the first end plate and a second steel sheet constituting the second end plate such that they are laminated in a state where their front and back sides are placed upside down. Hereby, as illustrated in FIG. 9A, the slits are all placed at different positions from each other when viewed from the one axial side. At this time, the slits may partially overlap with each other.

Similarly to this configuration, in the configuration illustrated in FIGS. 11 to 14, the V-shaped arrangement of the pin holes illustrated in FIG. 11 may be formed in the first end plate at a plurality of positions in the circumferential direction. At this time, in the second end plate 40, a V-shaped arrangement similar to the V-shaped arrangement of the pin holes illustrated in FIG. 13 may be formed at a plurality of positions in the circumferential direction. The V-shaped arrangements of the pin holes of FIGS. 11 and 13 accord with each other in a state where the first end plate 30 is placed in a reversed manner. On this account, steel sheets having the same shape are used for a first steel sheet constituting the first end plate and a second steel sheet constituting the second end plate such that they are laminated in a state where their front and back sides are placed upside down. At this time, as illustrated in FIG. 14, at least some of the pin holes may be placed at different positions from each other when viewed from the one axial side. Alternatively, all the pin holes may be placed at different positions. Further, in the configuration illustrated in FIGS. 17 to 19, two end plates may be formed such that at least some of the slits are placed at different positions when the end plates are reversed, and the two end plates may be laminated such that one of them is reversed. In such a configuration, a laminated structure of the end plates can be formed such that one of two end plates having the same shape is reversed and laminated, thereby making it possible to reduce a manufacturing cost.

Note that the configurations of the examples deal with a case where two magnets 16 are placed in a V-shape, but the magnets may be placed in the rotor 10 in a linear direction along the circumferential direction.

What is claimed is:

1. A rotary electric machine rotor comprising:
    a rotor core including a plurality of core steel sheets laminated to each other, and having a magnet hole extending in an axial direction of the rotary electric machine rotor;
    a magnet placed in the magnet hole;
    a first end plate placed adjacent to an axial end surface of the rotor core; and
    a second end plate laminated adjacent to a surface of the first end plate on an opposite side to the surface adjacent to the end surface, wherein
    the core steel sheets, the first end plate, and the second end plate are made of the same materials,
    the first end plate has at least one first hole and the first end plate covers an axial end surface of the magnet inside the magnet hole when viewed from one axial side of the rotor core,
    the second end plate has at least one second hole, and
    when viewed from the one axial side of the rotor core, the first hole and the second hole overlap with at least part of the magnet in the axial end surface of the magnet hole, and
    when viewed from the one axial side of the rotor core, the first hole has a part at least partially placed at a position different from the second hole.

2. The rotary electric machine rotor according to claim 1, wherein:
    the rotor core includes a resin portion placed in at least part of a gap between the magnet hole and the magnet, and extending in the axial direction;
    when viewed from the one axial side, the first hole and the second hole overlap with an axial end surface of the resin portion; and
    a part where the first hole and the second hole overlap with the axial end surface of the resin portion includes a part where the first hole includes a part at least partially placed at a position different from the second hole.

3. The rotary electric machine rotor according to claim 1, wherein:
    the first hole includes a plurality of first holes placed in the first end plate;
    the second hole includes a plurality of second holes placed in the second end plate; and
    when viewed from the one axial side, the plurality of first holes and the plurality of second holes overlap with the axial end surface of the magnet.

4. The rotary electric machine rotor according to claim 3, wherein:
    the rotor core includes a resin portion placed in at least part of a gap between the magnet hole and the magnet and extending in the axial direction;
    the first end plate has a plurality of third holes;
    the second end plate has a plurality of fourth holes; and
    when viewed from the one axial side, the plurality of third holes and the plurality of fourth holes overlap with the resin portion, and each of the plurality of third holes is at least partially placed at a position different from each of the plurality of fourth holes.

5. The rotary electric machine rotor according to claim 4, wherein the first holes and the third holes have a circular shape; and each of diameters of the third holes is smaller than each of diameters of the first holes.

6. The rotary electric machine rotor according to claim 5, wherein
    an arrangement distance between the first holes is larger than an arrangement distance between the third holes.

7. The rotary electric machine rotor according to claim 1, wherein:
    the first end plate and the second end plate have the same shape; and
    the first end plate and the second end plate are laminated in a state where a phase of the first end plate in a circumferential direction is different from a phase of the second end plate in the circumferential direction.

8. The rotary electric machine rotor according to claim 1, wherein:
    the first end plate and the second end plate have the same shape; and
    the first end plate and the second end plate are laminated in a state that either one of the first end plate and the second end plate is reversed.

* * * * *